United States Patent
Pelka et al.

(10) Patent No.: US 9,970,786 B2
(45) Date of Patent: May 15, 2018

(54) OSCILLATING MECHANISM COMPRISING AN ANGLE SENSOR

(71) Applicant: GRAMMER AG, Amberg (DE)

(72) Inventors: Joachim Pelka, Amberg (DE); Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 40 days.

(21) Appl. No.: 15/098,579

(22) Filed: Apr. 14, 2016

(65) Prior Publication Data
US 2016/0313140 A1    Oct. 27, 2016

(30) Foreign Application Priority Data
Apr. 24, 2015 (DE) .................. 10 2015 106 360

(51) Int. Cl.
| F16M 13/00 | (2006.01) |
|---|---|
| G01D 5/14 | (2006.01) |
| B60N 2/50 | (2006.01) |
| B60N 2/16 | (2006.01) |
| B60N 2/02 | (2006.01) |

(52) U.S. Cl.
CPC ............. *G01D 5/147* (2013.01); *B60N 2/162* (2013.01); *B60N 2/501* (2013.01); *B60N 2/508* (2013.01); *B60N 2002/0272* (2013.01)

(58) Field of Classification Search
CPC ...... B60N 2/162; B60N 2/1817; B60N 2/508; B60N 2/50; B60N 2/501; B60N 2/505; B60N 2/507; B60N 2/1615; B60G 17/00
USPC ............... 248/550, 564, 562, 588, 591, 636; 280/5.514, 5.515, 5.52; 297/344.15
See application file for complete search history.

(56) References Cited

U.S. PATENT DOCUMENTS

| 4,022,411 A * | 5/1977 | Rumsey ................. B60N 2/501 |
|---|---|---|
| | | 248/580 |
| 5,169,112 A | 12/1992 | Boyles et al. |
| 8,256,842 B2 * | 9/2012 | Himmelhuber ........ B60N 2/002 |
| | | 297/344.12 |
| 2006/0060750 A1 * | 3/2006 | Alexandridis ..... B60G 17/0152 |
| | | 248/588 |

FOREIGN PATENT DOCUMENTS

| DE | 43 35 199 C1 | 5/1995 |
|---|---|---|
| DE | 698 30 171 T2 | 1/2006 |
| DE | 102010026015 | 1/2012 |
| EP | 1533176 | 5/2005 |
| FR | 3007340 | 12/2014 |

\* cited by examiner

*Primary Examiner* — Christopher Garft
(74) *Attorney, Agent, or Firm* — Sheridan Ross P.C.

(57) ABSTRACT

Measurement device for a vehicle seat having a lower part and an upper part which is movable relative to the lower. A scissor-action frame comprising at least one first scissor part and at least one second scissor part is arranged between the upper vehicle seat part and the lower vehicle seat part. The first scissor part and the second scissor part are interconnected by means of a rotary axis and a first end region of the first scissor part is fixed to the lower vehicle seat part by a pivot axis. At least one angle sensor unit is fixed to the first scissor part and the angle sensor unit is movably connected to the lower vehicle seat part by means of a movable lever apparatus, wherein the angle sensor unit can be actuated by the lever apparatus when the height of the upper vehicle seat part is adjusted.

10 Claims, 6 Drawing Sheets

OSCILLATING MECHANISM COMPRISING AN ANGLE SENSOR

CROSS-REFERENCE TO RELATED APPLICATIONS

This application claims the benefit of German Patent Application No. 10 2015 106 360.3 filed Apr. 24, 2015, the entire content of which is incorporated herein by reference.

FIELD

The invention relates to a measurement device for a vehicle seat having a lower vehicle seat part and an upper vehicle seat part which is movable relative to the lower vehicle seat part, a scissor-action frame having at least one first scissor part and at least one second scissor part being arranged between the upper vehicle seat part and the lower vehicle seat part, the first and the second scissor part being interconnected by means of a rotary axis and a first end region of the first scissor part being pivotally fixed to the lower vehicle seat part by means of a pivot axis.

BACKGROUND

Measurement devices for measuring deflections of the upper vehicle seat part relative to the lower vehicle seat part and comprising a seatbelt-retracting mechanism are known in the art. One end of said seatbelt-retracting mechanism is connected to the upper vehicle seat part, one end of the seatbelt being connected to the lower vehicle seat part. Some of the seatbelt is therefore pulled out of the seatbelt-retracting mechanism and arranged between the upper vehicle seat part and the lower vehicle seat part. When the upper vehicle seat part is deflected relative to the lower vehicle seat part, the seatbelt is pulled further out of the seatbelt-retracting mechanism or is drawn further back into the seatbelt-retracting mechanism, depending on the direction of the deflection experienced. The deflection of the upper vehicle seat part can be determined on the basis of the change in the diameter of the seatbelt rolled up inside the seatbelt-retracting mechanism.

This type of measurement is, however, quite inaccurate since the diameter of the rolled-up seatbelt can never be determined exactly due to the resilience inherent in the seatbelt material the seatbelt consists of. It is not possible for the rolled-up seatbelt to have a constant diameter either, which can further distort the measurement result. Furthermore, this method involves an indirect measurement that can result in further measurement result errors.

SUMMARY

Therefore, the object of the present invention is to provide a cost-effective and simple measurement device which no longer has the above-mentioned disadvantages of the prior art.

The object is achieved by a measurement device for a vehicle seat having a lower vehicle seat part and an upper vehicle seat part which is movable relative to the lower vehicle seat part, a scissor-action frame comprising at least one first scissor part and at least one second scissor part being arranged between the upper vehicle seat part and the lower vehicle seat part, the first scissor part and the second scissor part being interconnected by means of a rotary axis and a first end region of the first scissor part being pivotally fixed to the lower vehicle seat part by means of a pivot axis, at least one angle sensor unit being fixed to the first scissor part in a first portion of the first scissor part and the angle sensor unit being movably connected to the lower vehicle seat part by means of a movable lever apparatus, and it being possible for the lever apparatus to actuate the angle sensor unit when the height of the upper vehicle seat part is adjusted.

The lower vehicle seat part is preferably rigidly connected to the body of the vehicle in which the vehicle seat is arranged. This means that the lower vehicle seat part remains substantially fixed in position in relation to the vehicle.

According to the invention, the upper vehicle seat part moves compared to the lower vehicle seat part, in particular relative to the lower vehicle seat part, when said lower part is fixed in position.

In this case, the vehicle seat preferably comprises a spring device and/or a damper device arranged between the upper vehicle seat part and the lower vehicle seat part. The spring device advantageously comprises a fluid spring, the fluid particularly preferably being air. Various designs such as those well-known in the art are, of course, conceivable for both the spring device and the damper device.

If the spring device comprises at least one fluid spring, advantageously an air spring, the measurement device can be arranged inside said fluid spring, making it possible to reduce the installation space required. In addition, the angle sensor unit is more effectively protected against damage and dirt accumulation, resulting in said unit having a longer service life and being operationally reliable.

According to the invention, the above-described scissor-action frame comprises at least one first scissor part and at least one second scissor part, which can also be referred to as scissor arms. The scissor frame can have a different design in this case; according to the invention, the first end region of the first scissor part is pivotally fixed to the lower vehicle seat part by means of a pivot axis, thus corresponding to a fixed bearing.

The scissor-action frame preferably comprises a first scissor consisting of a first inner scissor part and a second outer scissor part, and a second scissor consisting of an additional first inner scissor part and an additional second outer scissor part, the first and the second scissor advantageously being interconnected by means of at least one transverse connection.

In a second end region, the first scissor part advantageously comprises a floating bearing. The second scissor part advantageously has the same construction as the first scissor part, the fixed bearing of the second scissor part being arranged on the upper vehicle seat part.

According to a preferred embodiment, the first portion of the first scissor part is substantially arranged between the pivot axis and the rotary axis. The fact that the angle sensor unit is connected to the first scissor part in said first portion means that the angle sensor unit can ensure that oscillation of the scissor-action frame, in particular of the first scissor part, is detected directly. In this case, "direct oscillation detection" should be understood in particular to mean that the sensor is directly activated as a result of a change in the height of the upper vehicle seat part, which is synonymous with a pivot movement of the first scissor part, meaning that a more accurate measurement result of the parameter to be measured in each case can be obtained.

According to the invention, the angle sensor unit is movably connected to the lower vehicle seat part by means of a movable lever apparatus, the angle sensor unit being operable by means of the lever apparatus. It is therefore particularly advantageous for the angle sensor unit to comprise a rotary angle sensor which can detect a change in the angle of rotation. When the upper vehicle seat part is deflected relative to the lower vehicle seat part, i.e. the height of the vehicle seat is changed, the lever apparatus brings about a change in the angle of rotation.

Since the angle sensor unit is fixed to the first scissor part, the angle sensor unit moves on a curved path when the first scissor part is pivoted, for example as a result of the upper vehicle seat part being deflected relative to the lower vehicle seat part.

If the angle sensor unit thus moves on a curved path, the lever apparatus has to be designed such that it covers the corresponding degrees of freedom for the movement. If the first scissor part is arranged, for example, in a plane that is spanned by the vehicle seat longitudinal direction and the vehicle seat vertical direction, the angle sensor unit moves on a curved path in this plane. The lever apparatus accordingly has to move in this plane at least in part and cover the degrees of freedom in order to move in this plane.

According to a particularly advantageous embodiment, the lever apparatus comprises a first lever arm and a second lever arm. The first lever arm is advantageously pivotally connected in a first end region to the lower vehicle seat part by means of a first axis and the second lever arm is pivotally connected to a second end region of the first lever arm by means of a second axis, and a first end region of the second lever arm is pivotally connected to the angle sensor unit by means of a third axis.

This lever apparatus construction makes it possible for the lever apparatus to move in the spanned plane. This thus ensures that the angle sensor unit can always be actuated by the lever apparatus along the described curved path.

According to a preferred embodiment, a height adjustment of the vehicle seat can be measured by a change in the angle of rotation of the angle sensor unit, it being possible for the lever apparatus to bring about the change in the angle of rotation of the angle sensor unit.

The measurement device according to the invention thus makes it possible to measure an adjustment, preferably relative to a zero position, to the height of the vehicle seat. Therefore, a deflection of the vehicle seat relative to a zero position can also be measured.

The measurement device also advantageously makes it possible to measure deflection speeds and/or deflection accelerations.

According to a preferred embodiment, the measurement device is connected to a control device, it being possible for the data that is recorded by the measurement device and comprises a change in the spring deflection and/or a deflection speed and/or a deflection acceleration to be transmitted to the control device.

The control device can particularly advantageously control a spring characteristic of the spring system and/or the damping capacity of the damping apparatus using the data recorded.

It is advantageous for the spring rate to be set to soft during a normal driving operation so that the driver can experience the best possible driving comfort. If the vehicle were to drive into a pothole in the road, for example, the vehicle seat, in particular the upper vehicle seat part, would rebound as far as an end stop due to the soft spring rate, resulting in an abrupt end to the spring process and undesired forces suddenly acting on the driver. To avoid this, depending on the corresponding measurement result or the corresponding measurement results of the parameters, the spring rate is set, preferably by means of the control device, to be accordingly harder. The damping capacity of the damper device can accordingly also be changed by the control device on account of force being applied to the vehicle seat.

The angle sensor unit particularly preferably comprises a Hall effect sensor, with other standard variants for recording measured values of course also being conceivable.

Further advantageous embodiments can be found in the dependent claims.

BRIEF DESCRIPTION OF THE DRAWINGS

Additional aims, advantages and expediencies of the present invention can be found in the following description in conjunction with the drawings, in which.

DETAILED DESCRIPTION

Figure 1:
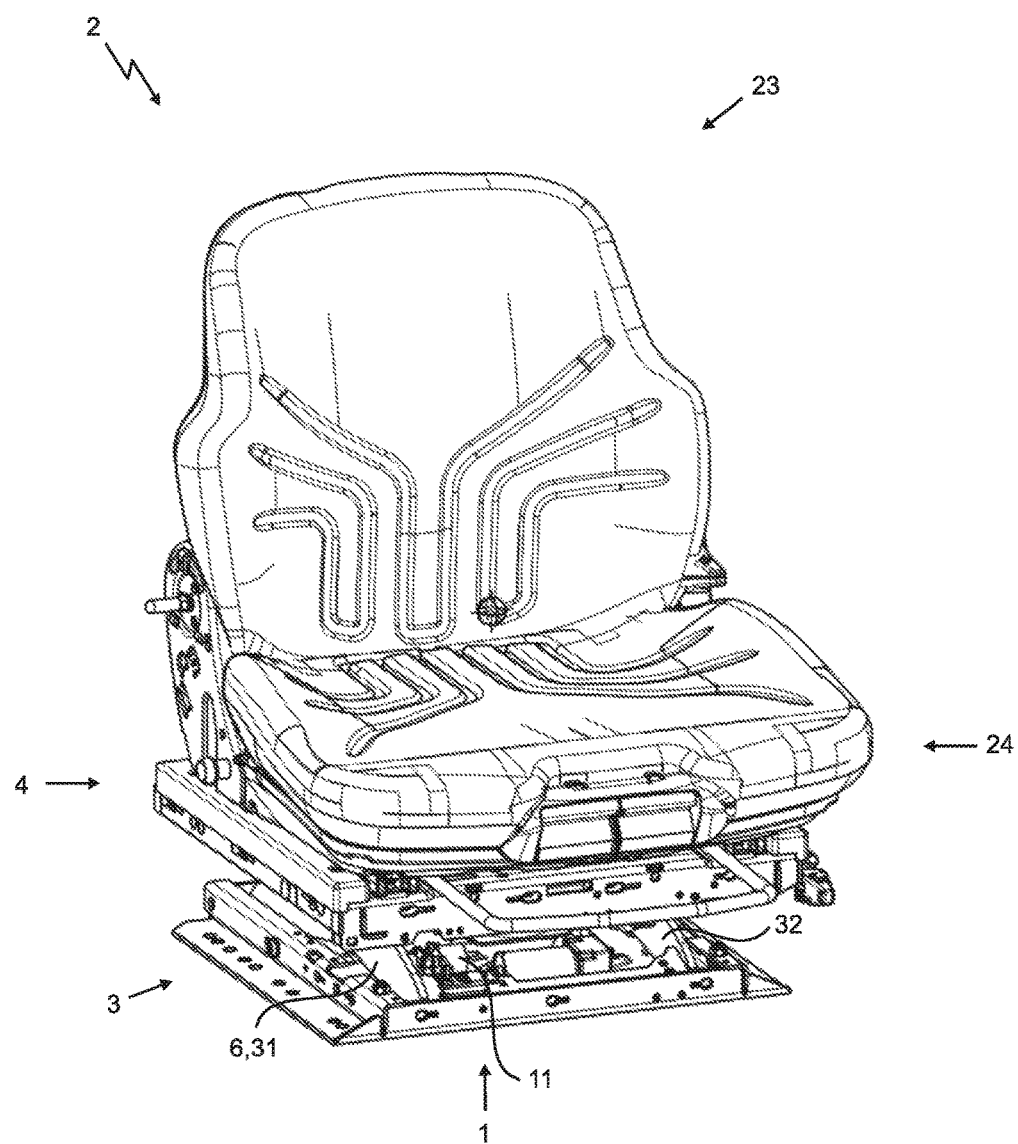
FIG. 1 shows a vehicle seat comprising a measurement device according to a preferred embodiment.

In this respect, FIG. 1 shows a vehicle seat 2 comprising a backrest 25 and a seat part 24, the seat part 24 being arranged on top of the upper vehicle seat part 4. The upper vehicle seat part 4 is connected to the lower vehicle seat part 3 by means of a scissor-action frame 6 having a first rocker 31 and a second rocker 32. The lower vehicle seat part 3 is preferably rigidly connected to a body of the vehicle (not shown in this case).

As can be seen, the measurement device 1 is arranged on the first scissor part 6 of the first rocker 31.

Figure 2A:
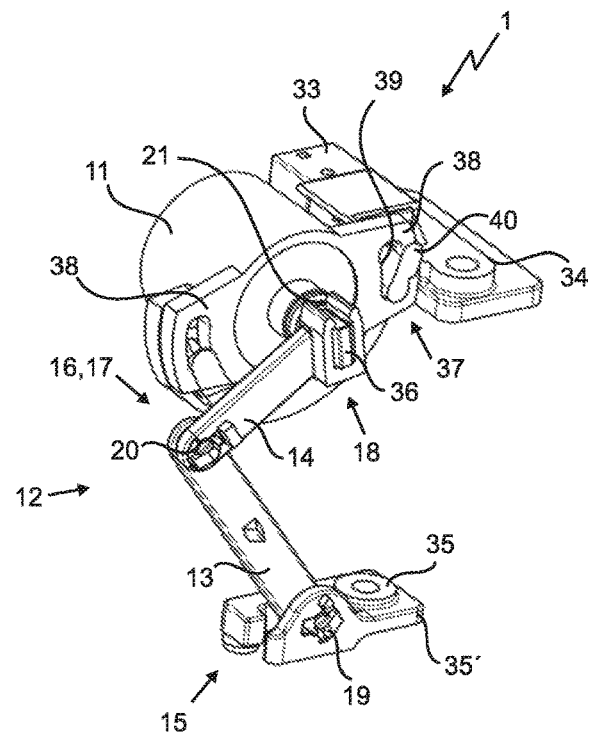
FIG. 2A is a perspective rear view of the measurement device.
Figure 2B:
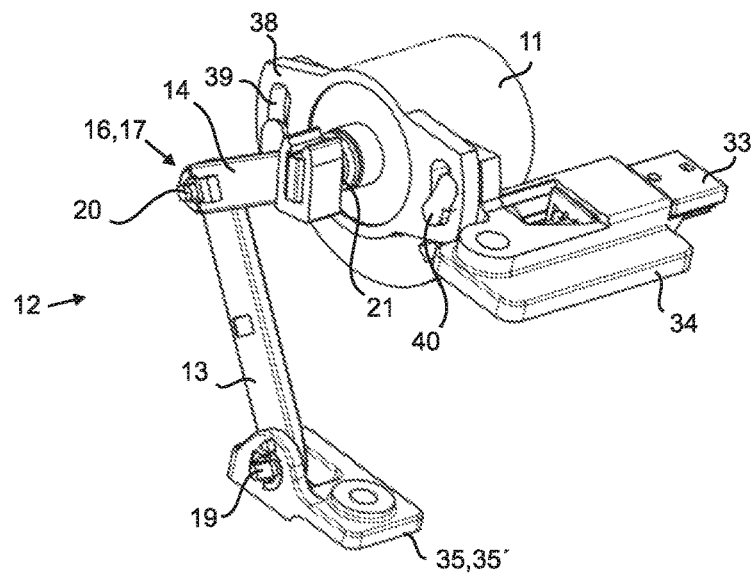
FIG. 2B is a perspective front view of the measurement device.

FIGS. 2A and 2B are detailed views of the measurement device 1 according to a particularly preferred embodiment.

As can be clearly seen in FIGS. 2A and 2B, the measurement device 1 comprises an angle sensor unit 11 which is connected to a lever apparatus 12 by means of a third axis 21. In this case, the lever apparatus 12 comprises a first lever arm 13 and a second lever arm 14, the first end region of the first lever arm 13 being pivotally connectable to the lower vehicle seat part 3 (not shown in this case) by means of a connection 35, in particular a screw connection 35 and a plate 35'.

A first end region of a second lever arm 14 is articulated in the second end region 16 of the first lever arm 13 by means of a second axis 20, the second lever arm being connectable to the angle sensor unit 11 in a second end region 18 of the second lever arm 14 by means of a third axis 21.

The second end region 18 of the second lever arm 14 is formed as a clip-on plug-in connection 36 in this case, by means of which particularly simple assembly and disassembly is possible.

As can be seen, the angle sensor unit 11 comprises two wings 38, each of which comprises a recess 39. A connecting element 40 of a retaining plate 34 can be inserted into this recess 39, the recess 39 being formed such that, once the connecting element 40 has been inserted into the recess 39, the connecting element 40 can be rotated in the recess 39 and is thus rigidly connected to the recess 39. This also facilitates mounting and removal of the measurement device 1 respectively.

The angle sensor unit 11 can also be just as easily connected to the first scissor part 6 by means of the retaining plate 34. Furthermore, the retaining plate 34 comprises a data interface 33 which can be used to transmit the measurement data from the angle sensor unit 11 to the control device 22 (not shown in this case). Conceivable data interfaces are a USB interface, a LAN connection or a Bluetooth connection, for example. The retaining plate 34 is advantageously already fixed to the first scissor part 6 such that the angle sensor unit 11 can be mounted on or removed from the first scissor part 6 in a simple manner.

Figure 3:
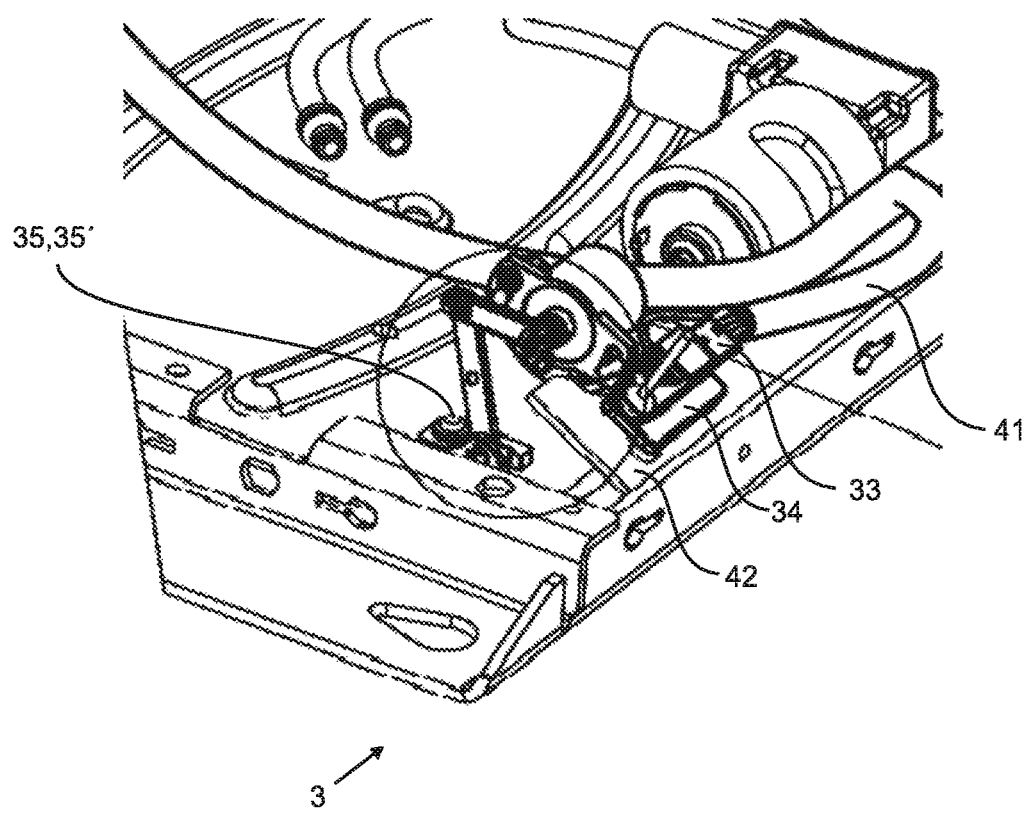
FIG. 3 shows the measurement device when installed.

FIG. 3 shows the measurement device 1 when installed. For reasons of clarity, the first scissor part 6 is not shown, instead only a connecting plate 42 is shown which is connected to the first scissor part 6 and on which the retaining plate 34 is mounted. Furthermore, FIG. 3 shows that, in this embodiment, the data can be led away from the measurement device 1, in particular the angle sensor unit 11, by means of a cable 41.

Figure 4A:
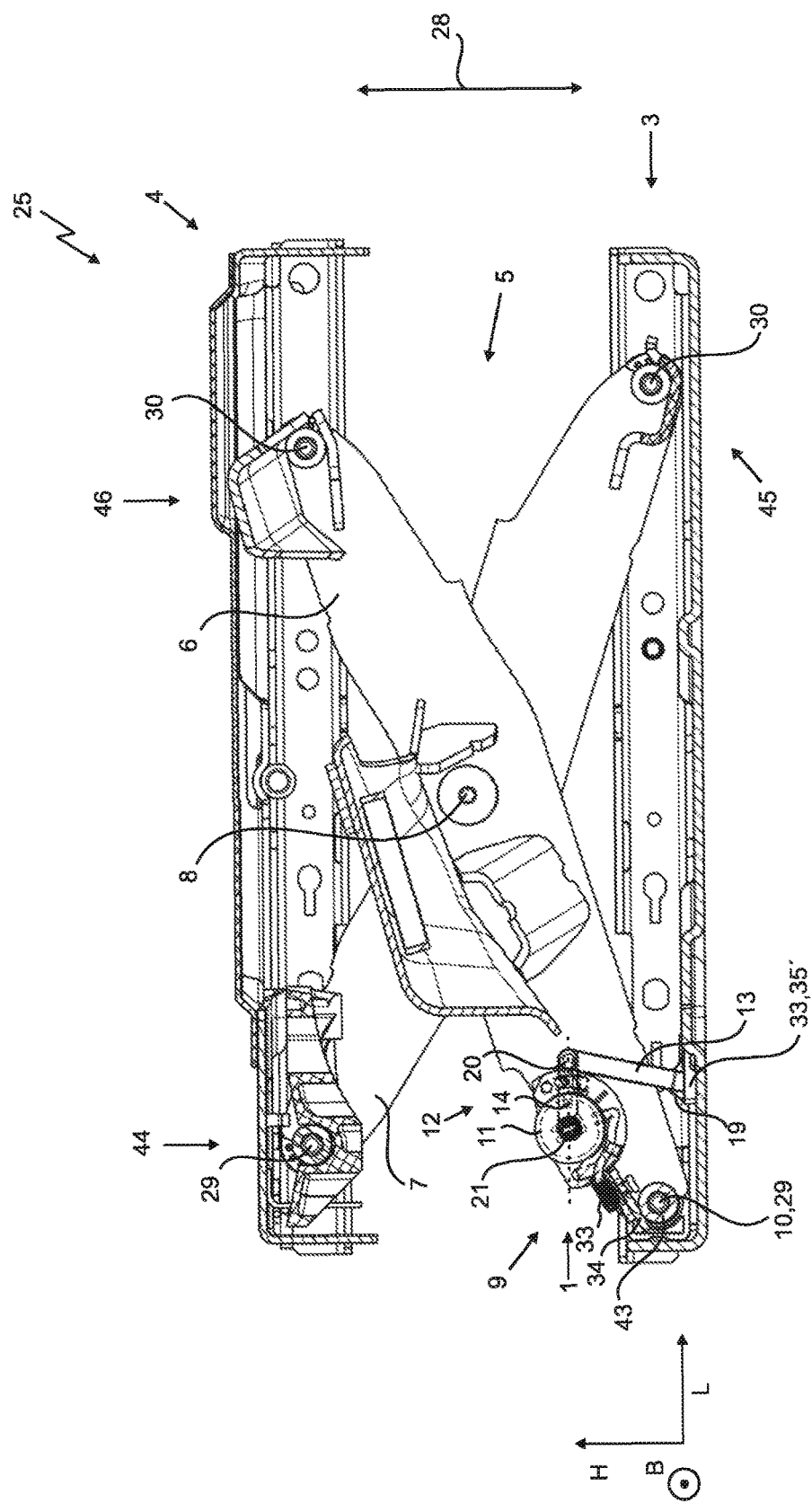
FIG. 4A shows the vehicle seat in a zero position.
Figure 4B:
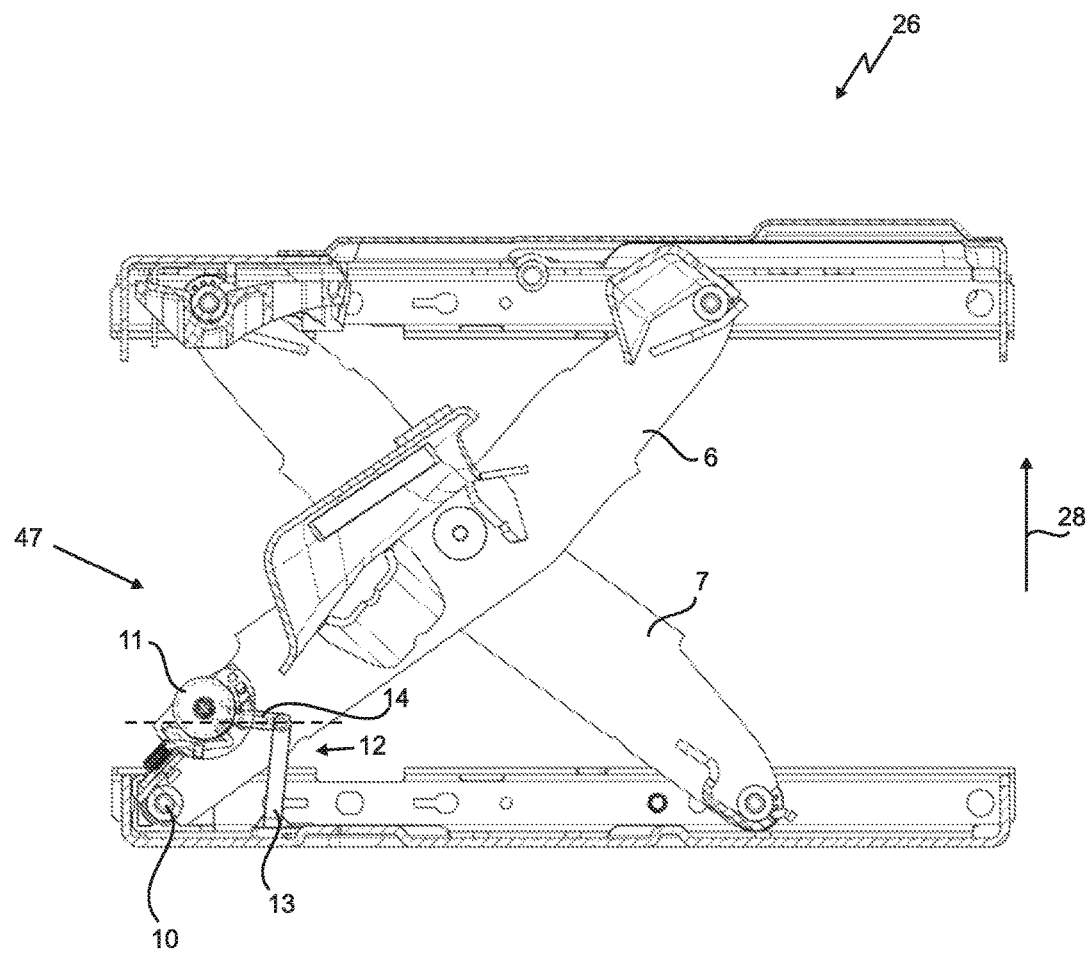
FIG. 4B shows the vehicle seat in a first position.
Figure 4C:
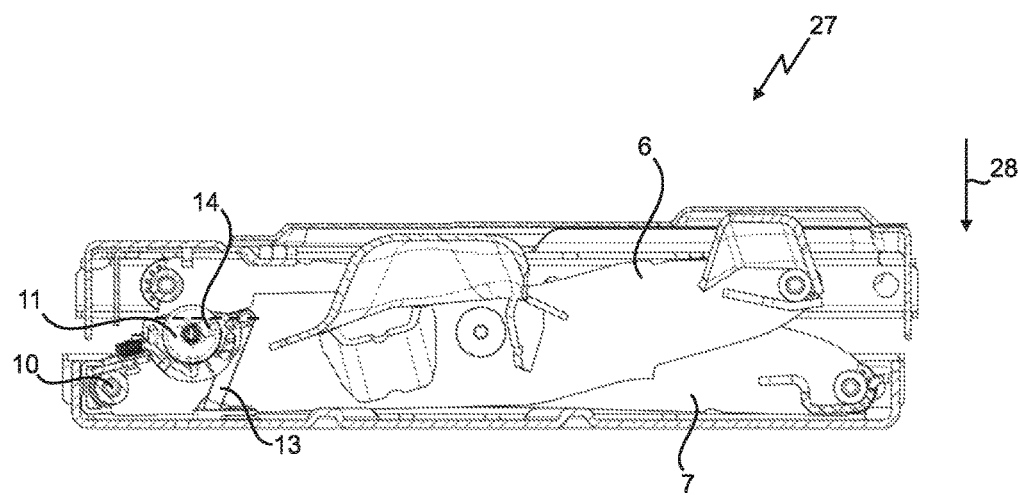
FIG. 4C shows the vehicle seat in a second position.

FIGS. 4A, 4B and 4C are also schematic views of the measurement device 1 when installed. These figures show the entire seat substructure comprising the upper vehicle seat part 4, the lower vehicle seat part 3, the scissor-action frame 5 and the measurement device 1 having the angle sensor unit 11 and the lever apparatus 12. The lever apparatus is designed such that it can carry out movements in the plane spanned by the vehicle seat longitudinal direction L and the vehicle seat vertical direction H. The first axis 19, the second axis 20 and the third axis 21 are substantially perpendicular to said plane in this case, i.e. they extend in the vehicle seat width direction B.

The scissor-action frame 5 can be seen in a side view and comprises a first scissor part 6 and a second scissor part 7, the first scissor part 6 and the second scissor part 7 being connected by means of a rotary axis. According to the invention, the first scissor part 6 is pivotally fixed in its first end region 9 to the lower vehicle seat part by means of a pivot axis 10. The first scissor part 6 is thus advantageously fixed to the lower vehicle seat part 3 by means of a fixed bearing 29. According to FIG. 4A, a first end region 44 of the second scissor part 7 is also connected to the upper vehicle seat part 4 by means of a fixed bearing 29. Due to this arrangement of the fixed bearings 29, each second end region 45, 46 of the first scissor part 6 and the second scissor part 7 has to be connected to the lower vehicle seat part 3 and the upper vehicle seat part 4, respectively, by means of a floating bearing.

The pivot axis 10 is surrounded by an envelope 43, for example in the form of a tube, in this case. The metal retaining plate 34 is preferably connected to the envelope 43, advantageously by means of a welded connection. This means that, when the upper vehicle seat part 4 is deflected, the first scissor part 6 is pivoted about the pivot axis 10 and the retaining plate is accordingly pivoted together therewith. This pivoting movement is clear from a comparison of FIG. 4A-C.

The angle sensor unit 11, which is also connected to the lower vehicle seat part 3 by means of a lever device 12, is also arranged on the metal retaining plate 34. The data recorded by the angle sensor unit 11 can be forwarded to a control device 22 (not shown in this case) by means of the data interface 33.

The vehicle seat 2 is in a zero position 25 in FIG. 4A. This preferably means that no force acts on the vehicle seat 2 and the vehicle seat substructure is set such that the upward spring travel is equal to the downward spring travel in the vehicle seat vertical direction H. For this purpose, the vehicle seat 2 advantageously comprises a height levelling unit (not shown in this case), which regulates the vehicle seat such that the vehicle seat is set in the zero position 25 when no forces are acting thereon.

If, for example, a force 28 then acts on the vehicle seat 2 in the vertical direction, i.e. in the vehicle seat vertical direction H, said vehicle seat will deflect the upper vehicle seat part 4 either downwards or upwards in the vehicle seat vertical direction H, depending on the direction of the force 28.

FIG. 4B shows the upper vehicle seat part 4 deflected upwards in the vehicle seat longitudinal direction H, and FIG. 4C shows the upper vehicle seat 4 deflected downwards.

As can clearly be seen in FIG. 4B when compared with FIG. 4A, the angle sensor unit 11 has been pivoted about the pivot axis 10 in a similar way to the first scissor part 6. By pivoting the angle sensor unit 11, the angle sensor unit 11 has been actuated by the lever apparatus 12, as can be seen from a comparison of the lever apparatus in FIG. 4A with that in FIG. 4B. In this case, the second lever arm 14 of the lever apparatus 12 substantially extends in the vehicle seat longitudinal direction L in FIG. 4A. In FIG. 4B, the second lever arm 14 deviates from this orientation and now extends at an angle to the vehicle seat longitudinal direction L.

It is of course also conceivable for the second lever arm 14 to already be at an angle to the vehicle seat longitudinal direction L.

The angle sensor unit 11 is actuated in a similar manner when a downward force 28 is applied in the vehicle seat vertical direction H, as shown in FIG. 4C. The first scissor part 6 is, however, pivoted in the opposite direction in this case. Accordingly, the second lever arm 14 is also deflected in the opposite direction to the vehicle seat longitudinal direction.

Depending on the actuation direction of the angle sensor unit 11, it can thus be determined whether this is an upward deflection or a downward deflection in the vehicle seat vertical direction H. By means of the data recorded by the angle sensor unit, it can be determined, preferably by means of the control device, in what way the upper vehicle seat part 4 was deflected relative to the lower vehicle seat part 3. More advantageously, using these values, the control device can also determine the speed of said deflection and what acceleration is acting on the upper vehicle seat part 4. The deflection extent, deflection speed and deflection acceleration can thus be determined.

The control device can advantageously use these values for the extent, speed and acceleration to change the spring properties and/or the damping properties of a spring and/or a damper (not shown in this case) in order to prevent critical deflection as far as the relevant end stop and to prevent such abrupt and unwanted stoppages of the deflection movement for the driver. Furthermore, this can thus make the driving experience comfortable and safe for the driver.

All of the features disclosed in the application documents are claimed as being essential to the invention provided that they are novel over the prior art, either individually or in combination.

LIST OF REFERENCE NUMERALS

1 Measurement device
2 Vehicle seat

3 Lower vehicle seat part
4 Upper vehicle seat part
5 Scissor-action frame
6 First scissor part
7 Second scissor part
8 Rotary axis
9 First end region
10 Pivot axis
11 Angle sensor unit
12 Lever apparatus
13 First lever arm
14 Second lever arm
15 First end region of the first lever arm
16 Second end region of the first lever arm
17 First end region of the second lever arm
18 Second end region of the second lever arm
19 First axis
20 Second axis
21 Third axis
22 Control device
23 Backrest
24 Seat part
25 Zero position
26 First position
27 Second position
28 Force application direction
29 Fixed bearing
30 Floating bearing
31 First rocker
32 Second rocker
33 Data interface
34 Retaining plate
35 Screw connection
35' Plate
36 Plug-in connection
37 Plug-in connection
38 Wing
39 Recess
40 Connecting element
41 Cable
42 Metal connecting plate
43 Envelope
44 First end region of the second scissor part
45 Second end region of the second scissor part
46 Second end region of the first scissor part
47 First portion

What is claimed is:

1. A measurement device for a vehicle seat comprising a lower vehicle seat part and an upper vehicle seat part which is movable relative to the lower vehicle seat part, a scissor-action frame having at least one first scissor part and at least one second scissor part being arranged between the upper vehicle seat part and the lower vehicle seat part, the first scissor part and the second scissor part being interconnected by means of a rotary axis and a first end region of the first scissor part being pivotally fixed to the lower vehicle seat part by means of a pivot axis, wherein at least one angle sensor unit is fixed to the first scissor part in a first portion of the first scissor part that is arranged between the rotary axis and the lower vehicle seat part, wherein the angle sensor unit is movably connected to the lower vehicle seat part by a movable lever apparatus, wherein the lever apparatus actuates the angle sensor unit when the height of the upper vehicle seat part is adjusted, wherein the measurement device further comprises an envelope, wherein the envelope is concentric with the pivot axis, and wherein the angle sensor unit is fixed to the envelope.

2. The measurement device according to either claim 1, wherein the lever apparatus comprises a first lever arm and a second lever arm, the first lever arm being pivotally connected in a first end region to the lower vehicle seat part by means of a first axis and the second lever arm being pivotally connected to a second end region of the first lever arm by means of a second axis, and a first end region of the second lever arm being pivotally connected to the angle sensor unit by means of a third axis.

3. The measurement device according to claim 1, wherein the angle sensor unit is moved on a curved path when the first scissor part is pivoted.

4. The measurement device according to claim 1, wherein the angle sensor unit is arranged in the first end region of the first scissor part, near to the pivot axis.

5. The measurement device according to claim 1, wherein a height adjustment of the vehicle seat is measured by a change in the angle of rotation of the angle sensor unit, and wherein the lever apparatus changes the angle of rotation of the angle sensor unit.

6. The measurement device according to claim 1, wherein the measurement device is connected to a control device, and data that is recorded by the measurement device and comprises a change in at least one of a spring deflection, a deflection speed, and a deflection acceleration is transmitted to the control device.

7. The measurement device according to claim 6, wherein the control device controls a spring characteristic of at least one of a spring system and a damping capacity of a damping apparatus using the data recorded by the measurement device.

8. The measurement device according to claim 1, wherein the angle sensor unit comprises a Hall effect sensor.

9. The measurement device according to claim 1, further comprising:
a retaining plate, wherein the angle sensor unit is fixed to the envelope by the retaining plate.

10. The measurement device according to claim 1, wherein the angle sensor unit is adjacent to a lower quarter of the lower scissor, proximate to the pivot axis.

* * * * *